Patented Dec. 5, 1950

UNITED STATES PATENT OFFICE 2,533,134

5-BROMO-2,3,4,5-TETRACHLOROPENTA-DIENOIC ACID

Earl T. McBee and Jack S. Newcomer, West Lafayette, Ind., assignors to Purdue Research Foundation, West Lafayette, Ind., a corporation of Indiana No Drawing. Application October 1, 1948, Serial No. 52,403

3 Claims. (Cl. 260—539)

The present invention is concerned with a novel perhalo acid, 5-bromo-2,3,4,5-tetrachloropentadienoic acid. This application is a continuation-in-part of our application Serial 757,949, filed June 28, 1947.

The compound of this invention is a white crystalline solid, having a melting point of about 119 degrees centigrade, of particular utility as an intermediate to be used in the preparation of more complex organic molecules, and has additional utility as a resin ingredient and as a reactant in the preparation of plasticizers, as well as in the preparation of definite Grignard reagents through the terminal bromine atom.

We have prepared the above-named compound by hydrolyzing, with an alkali metal hydroxide, e. g., sodium or potassium hydroxide, a perhalocyclopentenone having a bromine atom attached to a carbon atom adjacent to the carbonyl group, said cyclopentenone not containing more than two bromine atoms, e. g., 5-bromo-2,3,4,4,5-pentachloro-2-cyclopentene-1-one and 2,3,4,5 - tetrachloro - 4,5 - dibromo - 2 - cyclopentene-1-one. The reaction mixture is then acidified with a mineral acid, the acid separated and purified, if desired, according to conventional procedure. The dibromoketone may be reacted per se with the alkali metal hydroxide, or it may be produced in situ from the dibromoketal by hydrolysis with strong acid, e. g., concentrated sulfuric acid.

The result of our process is indeed unpredictable, since it was expected that the dehydrohalogenation involving substituents on the gamma and delta carbon atoms would remove the bromine atom preferably to the chlorine atom, in accord with the known relative dehydrohalogenation tendency.

The following examples are given to illustrate the practice of our invention but are not to be construed as limiting.

Example 1

A ten percent solution of potassium hydroxide was added to 14 grams of 5 - bromo - 2,3,4,4,5-pentachloro-2-cyclopentene-1-one (prepared by bromination of pentachlorocyclopentenone) at 25 degrees centigrade. Acidification of the basic solution with dilute hydrochloric acid resulted in the precipitation of a brown acid. Recrystallization from carbon tetrachloride gave six grams of 5-bromo-2,3,4,5-tetrachloropentadienoic acid, a white solid having a melting point of 119 degrees centigrade. The compound was found to contain 56.0 percent halogen as compared to the calculated value of 56.4 percent halogen. The analysis was performed on the assumption that all the halogen was chlorine.

Example 2

A mixture of 150 grams of bromine, 200 grams of tetrachloro-5,5-dimethoxycyclopentadiene and 500 grams of carbon tetrachloride was maintained at 35 degrees centigrade for 1.5 hours and then heated on a steam bath to remove the solvent and excess bromine. The resulting dibromo ketal was added slowly to concentrated sulfuric acid at 35 degrees centigrade and the mixture then poured onto ice to give 2,3,4,5-tetrachloro-4,5-dibromo-2-cyclopentene-1-one. The organic dibromoketone layer was dissolved in 10 percent potassium hydroxide at 30 degrees centigrade. Acidification of the basic solution with dilute hydrochloric acid resulted in the precipitation of 5-bromo-2,3,4,5-tetrachloropentadienoic acid, having a melting point of 119 degrees centigrade. This acid did not depress the melting point of 5-bromo-2,3,4,5-tetrachloropentadienoic acid obtained by treatment of 5-bromo-2,3,4,4,5-pentachloro-2-cyclopentene-1-one with potassium hydroxide and hydrochloric acid.

Various modifications may be made in the method of the present invention without departing from the spirit or scope thereof and it is to be understood that we limit ourselves only as defined in the appended claims.

We claim:

1. 5 - bromo - 2,3,4,5 - tetrachloropentadienoic acid, being in a purified state, a white crystalline solid having a melting point of about 119 degrees centigrade.

2. The process for the production of 5-bromo-2,3,4,5-tetrachloropentadienoic acid which includes the step of hydrolyzing a compound selected from the group consisting of 5 - bromo-2,3,4,4,5-pentachloro-2-cyclopentene-1-one and 4,5 - dibromo - 2,3,4,5 - tetrachloro - 2 - cyclopentene-1-one with an alkali metal hydroxide solution and subsequently acidifying the resulting product with a mineral acid.

3. The process for the production of 5-bromo-2,3,4,5-tetrachloropentadienoic acid, which includes the step of hydrolyzing 5-bromo-2,3,4,5-pentachloro-2-cyclopentene-1-one with an alkali metal hydroxide solution and subsequently acidifying the resulting mixture with a mineral acid.

EARL T. McBEE.
JACK S. NEWCOMER.

REFERENCES CITED

The following references are of record in the file of this patent:

Zincke et al., Beilstein (Handbuch, 4th ed.), vol. 2, page 486 (1920).
Prins, Chem. Abstracts, vol. 41, col. 686 (1947) (Abstract of Article dated 1946).